US012160724B2

(12) United States Patent
Yang et al.

(10) Patent No.: US 12,160,724 B2
(45) Date of Patent: Dec. 3, 2024

(54) VOICE COIL AND SOUNDING DEVICE USING SAME

(71) Applicant: AAC Microtech (Changzhou) Co., Ltd., Changzhou (CN)

(72) Inventors: Huhu Yang, Shenzhen (CN); Zhaoyu Yin, Shenzhen (CN); Wei Wei, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 203 days.

(21) Appl. No.: 18/089,577

(22) Filed: Dec. 28, 2022

(65) Prior Publication Data

US 2024/0064469 A1 Feb. 22, 2024

Related U.S. Application Data

(63) Continuation of application No. PCT/CN2022/125143, filed on Oct. 13, 2022.

(30) Foreign Application Priority Data

Aug. 22, 2022 (CN) ......................... 202222212720.7

(51) Int. Cl.
*H04R 9/06* (2006.01)
*H04R 1/06* (2006.01)
*H04R 9/02* (2006.01)
*H04R 9/04* (2006.01)

(52) U.S. Cl.
CPC ................. *H04R 9/06* (2013.01); *H04R 1/06* (2013.01); *H04R 9/025* (2013.01); *H04R 9/04* (2013.01); *H04R 9/046* (2013.01); *H04R 2209/041* (2013.01)

(58) Field of Classification Search
CPC . H04R 1/06; H04R 9/025; H04R 9/04; H04R 9/046; H04R 9/06; H04R 2209/041
See application file for complete search history.

(56) References Cited

U.S. PATENT DOCUMENTS 6,421,449 B1 * 7/2002 Hasegawa .............. H04R 9/046 381/407
11,490,206 B1 * 11/2022 Hsu ........................ H04R 9/043
2018/0295451 A1 * 10/2018 Min ......................... H04R 7/18

* cited by examiner

*Primary Examiner* — Huyen D Le
(74) *Attorney, Agent, or Firm* — W&G Law Group

(57) ABSTRACT

Disclosed are a voice coil and a sounding device using the voice coil. The coil body includes at least two sub coils fixed together in sequence. Each sub coil is provided with an incoming wire end and an outgoing wire end, and forms only one current path from the incoming wire end to the outgoing wire end and flowing in the same direction. The incoming wire ends of the at least two sub coils are welded together to form an incoming area on the coil body. The outgoing wire ends of the at least two sub coils are welded together to form an outgoing area on the coil body. The voice coil and the sounding device can select a wire with a lighter weight and a greater resistance, thereby decreasing a weight of a vibration system of the sounding device and improving a mid-frequency performance of the sounding device.

9 Claims, 6 Drawing Sheets

VOICE COIL AND SOUNDING DEVICE USING SAME

FIELD OF THE PRESENT DISCLOSURE

The present disclosure relates to electroacoustic transducers, in particular to a voice coil and a sounding device using the voice coil.

DESCRIPTION OF THE RELATED ART

A sounding device in the related art includes a magnetic circuit system and a vibration system. The vibration system includes a diaphragm and a voice coil driving the diaphragm for vibrating and emitting sounds, where, the voice coil is formed by winding a single wire coil by coil.

If F denotes the driving force of the voice coil, then F=B*L*I, where, B denotes the electromagnetic induction intensity of the magnetic circuit system, L denotes the total wire length of the voice coil, I denotes the value of the current flowing through the voice coil. In the case that B and L are certain, to get a bigger F requires a bigger I. If the voltage across the voice coil is certain, it needs to reduce the wire resistance of the voice coil to get a bigger I, thus a thicker wire is needed to wind the voice coil, resulting in the increased weight of the voice coil, thereby the mid-frequency performance of the sounding device is not good due to the increased weight of the vibration system.

Thus, it is necessary to provide a novel voice coil and a sounding device using the voice coil to solve the problem.

SUMMARY

An objective of the present disclosure is to overcome the above technical problems and provide a voice coil and a sounding device using the voice coil that can select a wire with a lighter weight and a greater resistance, thereby the weight of the vibration system decreases and the mid-frequency performance of the sounding device gets better.

In order to achieve the objective mentioned above, the present disclosure discloses a voice coil, applied to a sounding device, including a coil body. The coil body includes at least two sub coils fixed together in sequence. Each sub coil is provided with an incoming wire end and an outgoing wire end. Each sub coil forms only one current path from the incoming wire end to the outgoing wire end and flowing in the same direction. The incoming wire ends of the at least two sub coils are welded together to form an incoming area on the coil body. The outgoing wire ends of the at least two sub coils are welded together to form an outgoing area on the coil body.

As an improvement, the at least two sub coils are stacked up and down in sequence to form the coil body.

As an improvement, the at least two sub coils are sleeved one another in sequence to form the coil body.

As an improvement, each sub coil is wound separately, at least one sub coil has a different wire material than another sub coil.

As an improvement, the voice coil further includes an incoming lead connected to the incoming area and an outgoing lead connected to the outgoing area.

Further, the present disclosure also discloses a sounding device using any of the aforesaid voice coils.

As an improvement, the sounding device further includes a flexible printed circuit board. The flexible printed circuit board includes a fixed end and a free end extending from the fixed end and connected to the voice coil. The free end is provided with two pads, one pad is connected to the incoming area, and the other pad is connected to the outgoing area.

As an improvement, the sounding device further includes a conductive connector. The conductive connector is provided with two pads, the incoming lead is connected to one pad, and the outgoing lead is connected to the other pad.

In the voice coil and the sounding device using the voice coil according to the present disclosure, the coil body of the voice coil includes at least two sub coils fixed together in sequence. Each sub coil is provided with an incoming wire end and an outgoing wire end. Each sub coil forms only one current path from the incoming wire end to the outgoing wire end and flowing in the same direction. The incoming wire ends of the at least two sub coils are welded together to form an incoming area on the coil body. The outgoing wire ends of the at least two sub coils are welded together to form an outgoing area on the coil body. Compared with the related art, in the case that B, L, and the voltage across the voice coil are certain, the voltage across each sub coil conducted by the incoming area and the outgoing area is same as before, and because the divided wire length of each sub coil becomes smaller, the resistance of each sub coil becomes smaller, if obtain the same driving force as before, the resistance of each sub coil can be larger, as a result, a wire with a lighter weight and a greater resistance can be selected, thereby the weight of the vibration system decreases and the mid-frequency performance of the sounding device gets better.

BRIEF DESCRIPTION OF THE DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art based on the accompanying drawings without creative efforts, wherein.

DETAILED DESCRIPTION OF THE EMBODIMENTS

The technical solutions in embodiments of the present disclosure will be described clearly and completely below with reference to the accompanying drawings in the embodiments of the present disclosure. It is apparent that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Figure 1:
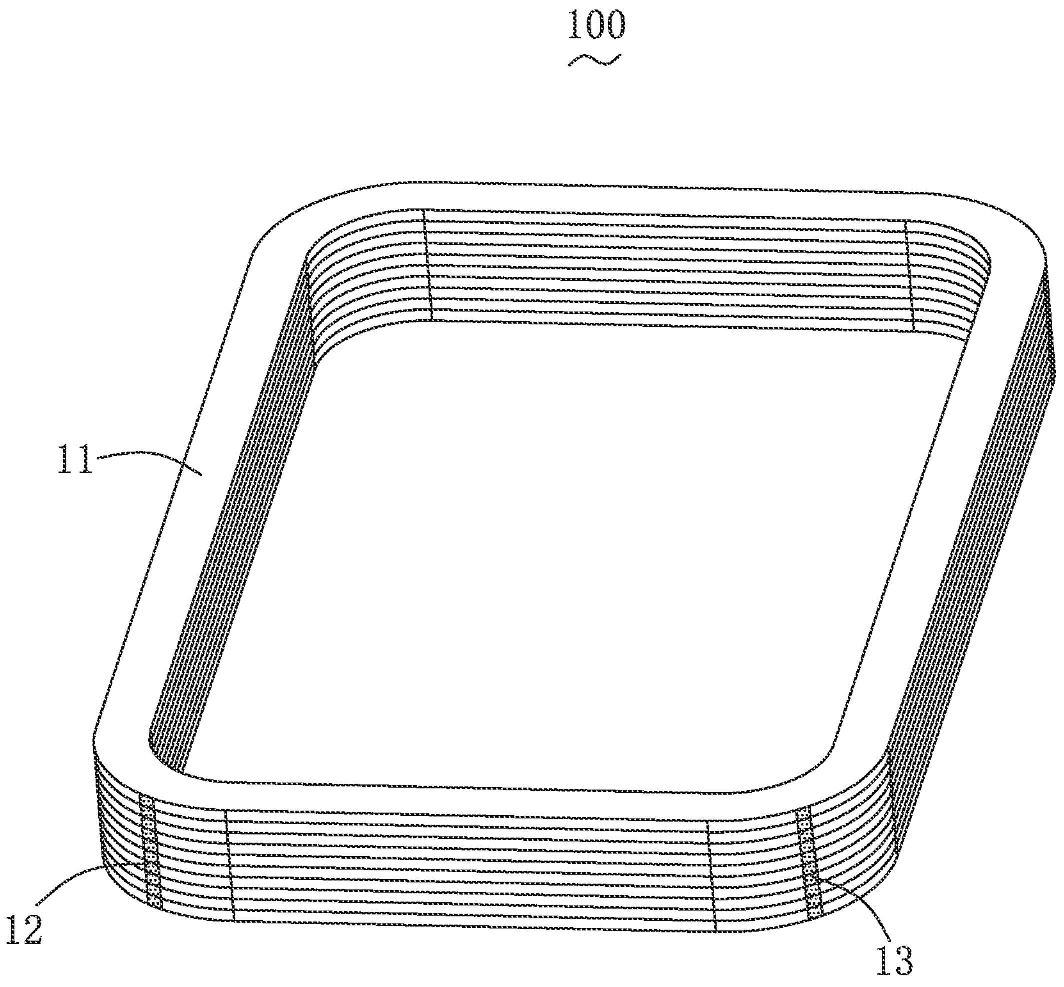
FIG. 1 is a structural schematic diagram of a first voice coil according to the present disclosure.
Figure 2:
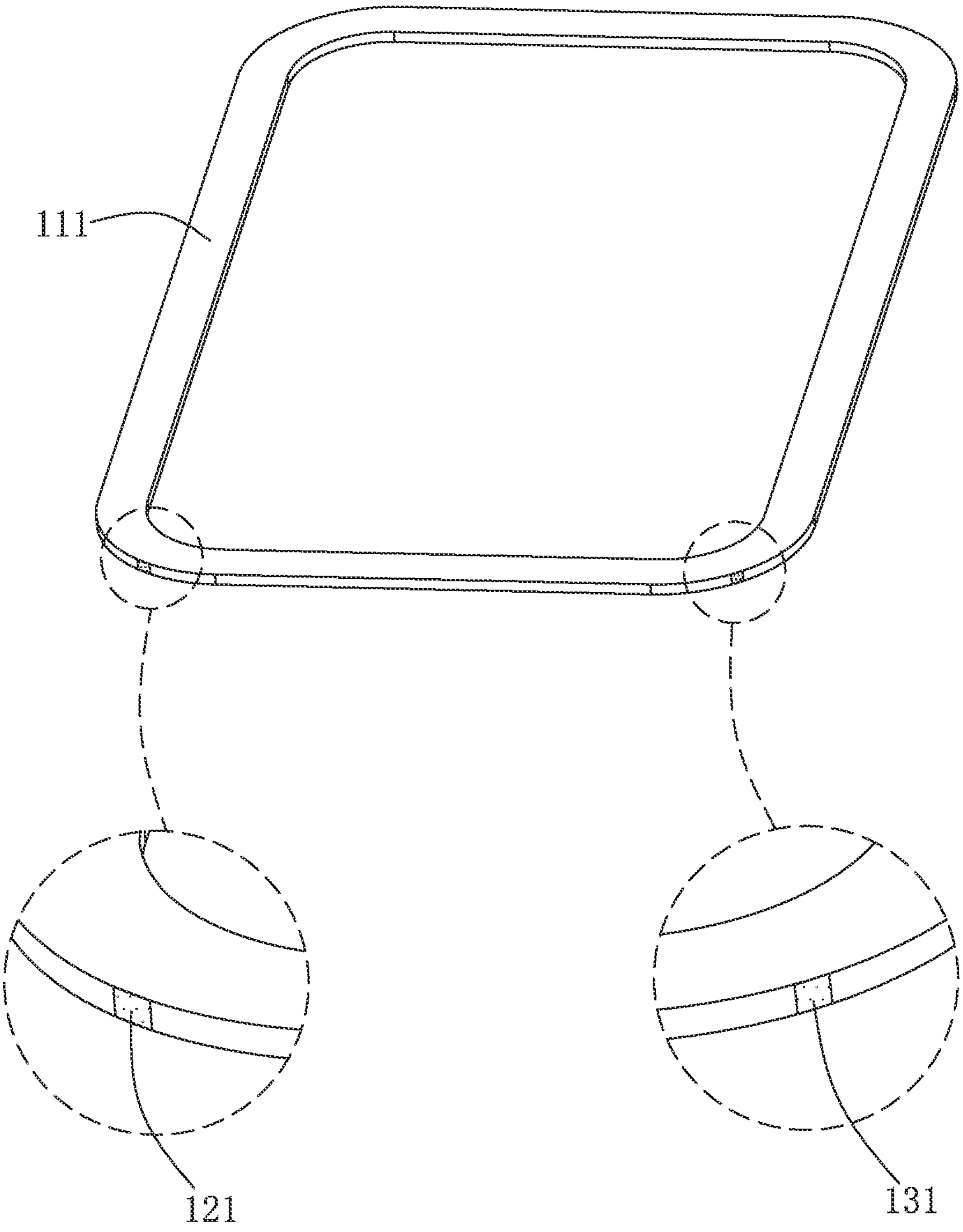
FIG. 2 is a structural schematic diagram of a sub coil of the first voice coil in FIG. 1.

Referring to FIGS. 1-2, the present disclosure discloses a voice coil 100 including a coil body 11. The coil body 11 includes at least two sub coils 111 fixed together in sequence. Each sub coil 111 is provided with an incoming wire end 121 and an outgoing wire end 131. Each sub coil 111 forms only one current path from the incoming wire end 121 to the outgoing wire end 131 and flowing in the same direction. The incoming wire ends 121 of the at least two sub coils 111 are welded together to form an incoming area 12 on the coil body 11. The outgoing wire ends 131 of the at least two sub coils 111 are welded together to form an outgoing area 13 on the coil body 11. In this embodiment, the at least two sub coils 111 are stacked up and down in sequence to form the coil body 11.

Figure 3:
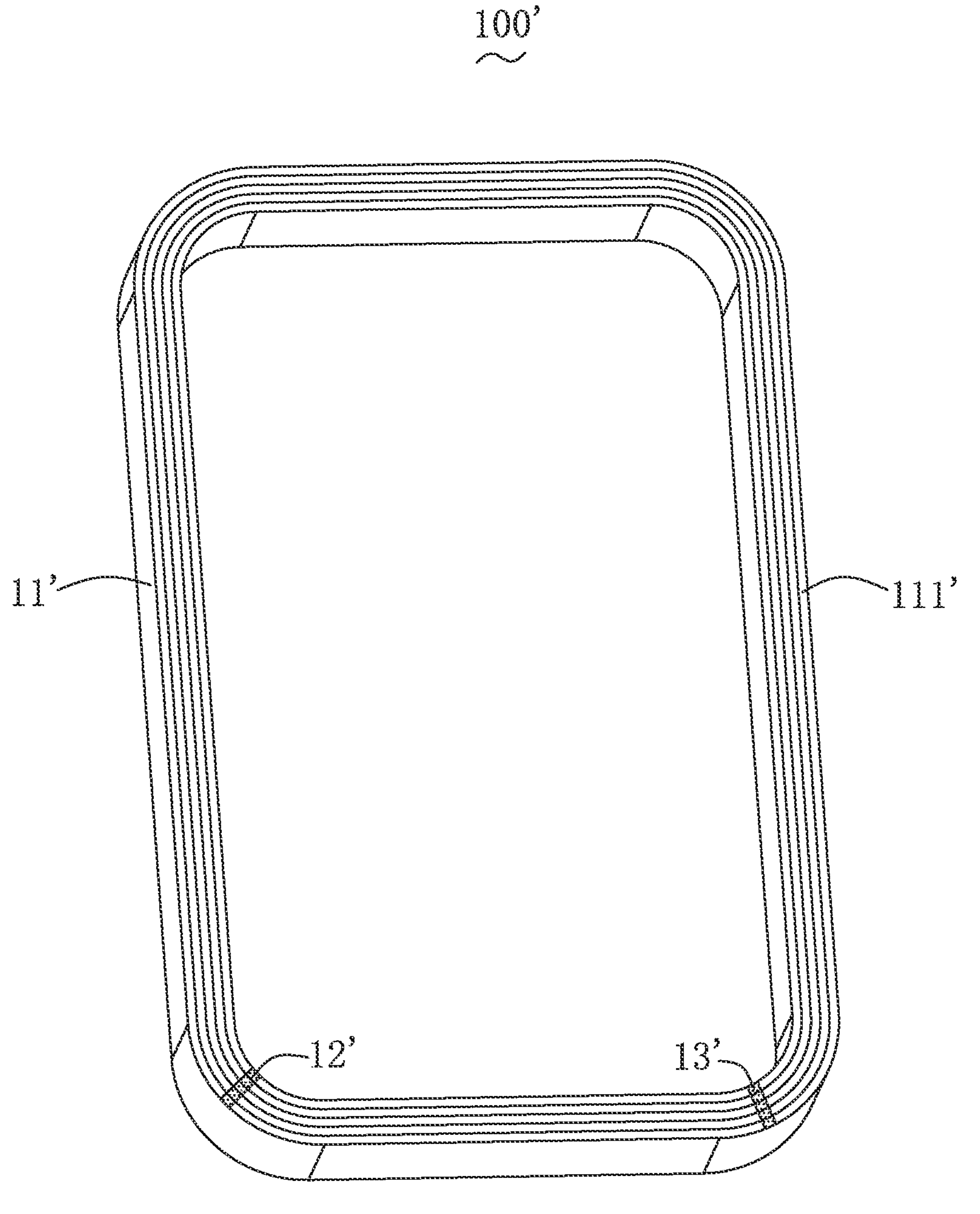
FIG. 3 is a structural schematic diagram of a second voice coil according to the present disclosure.

In other embodiments, as a choice, referring to FIG. 3, in another voice coil 100', the at least two sub coils 111' also can be sleeved one another in sequence to form the coil body 11'. An incoming area 12' and an outgoing area 13' are formed on the coil body 11' in the same way as the coil body 11.

In addition, as a choice, each sub coil 111/111' is wound separately, at least one sub coil 111/111' has a different wire material than another sub coil 111/111'. In this way, the coil body 11/11' may be formed in different shapes, such as abnormal shapes including steps, grooves and the like, thus the coil body 11/11' can be adapted to different application environments.

Figure 4:
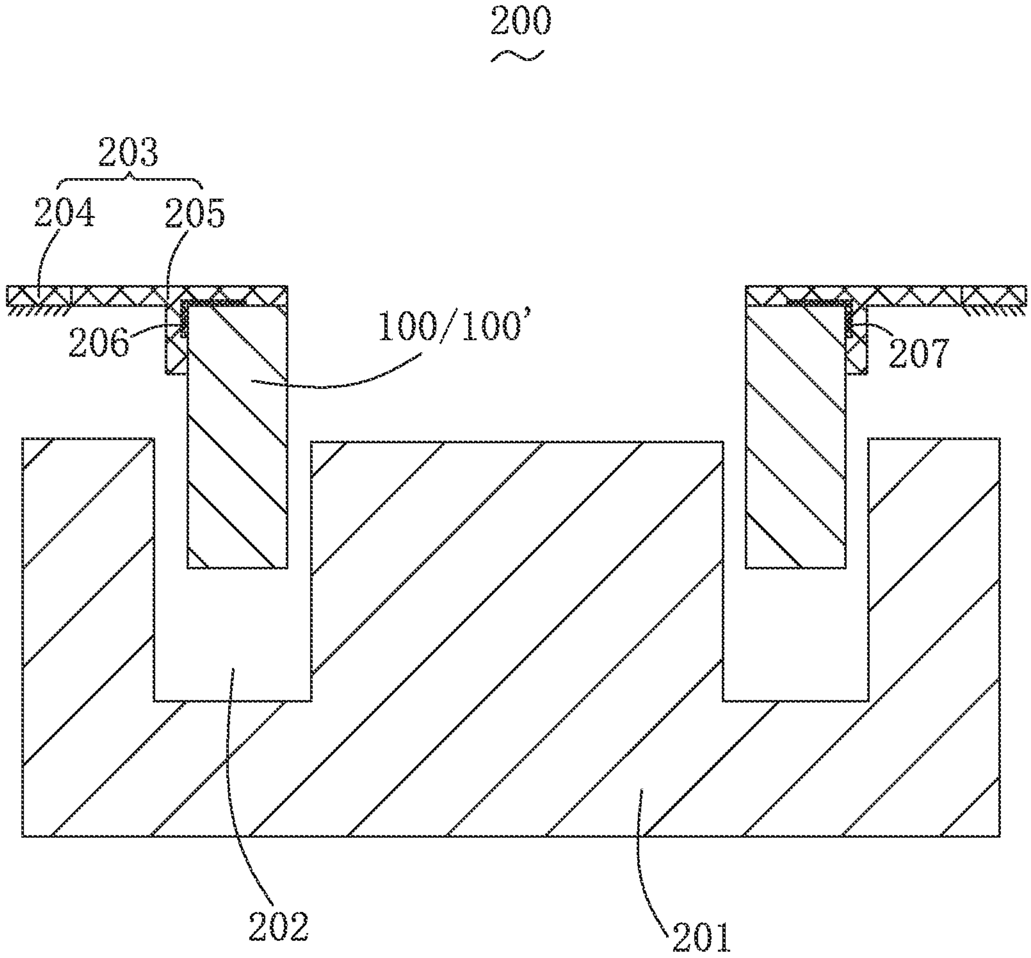
FIG. 4 is a structural schematic diagram of a first sounding device according to the present disclosure.

Referring to FIG. 4, the present disclosure also discloses a sounding device 200 including the voice coil 100/100' and a magnetic circuit system 201. The voice coil 100/100' locates in a magnetic gap 202 of the magnetic circuit system 201. The sounding device 200 further includes a flexible printed circuit board 203. The flexible printed circuit board 203 includes a fixed end 204 and a free end 205 extending from the fixed end 204 and connected to the voice coil 100/100'. The free end 205 is provided with two pads, one pad 206 is connected to the incoming area, and the other pad 207 is connected to the outgoing area. The fixed end 204 can be fixed to a fixed position of the sounding device 200. The flexible printed circuit board 203 is electrically connected to the voice coil 100/100' and helps to support the voice coil 100/100'.

Figure 5:
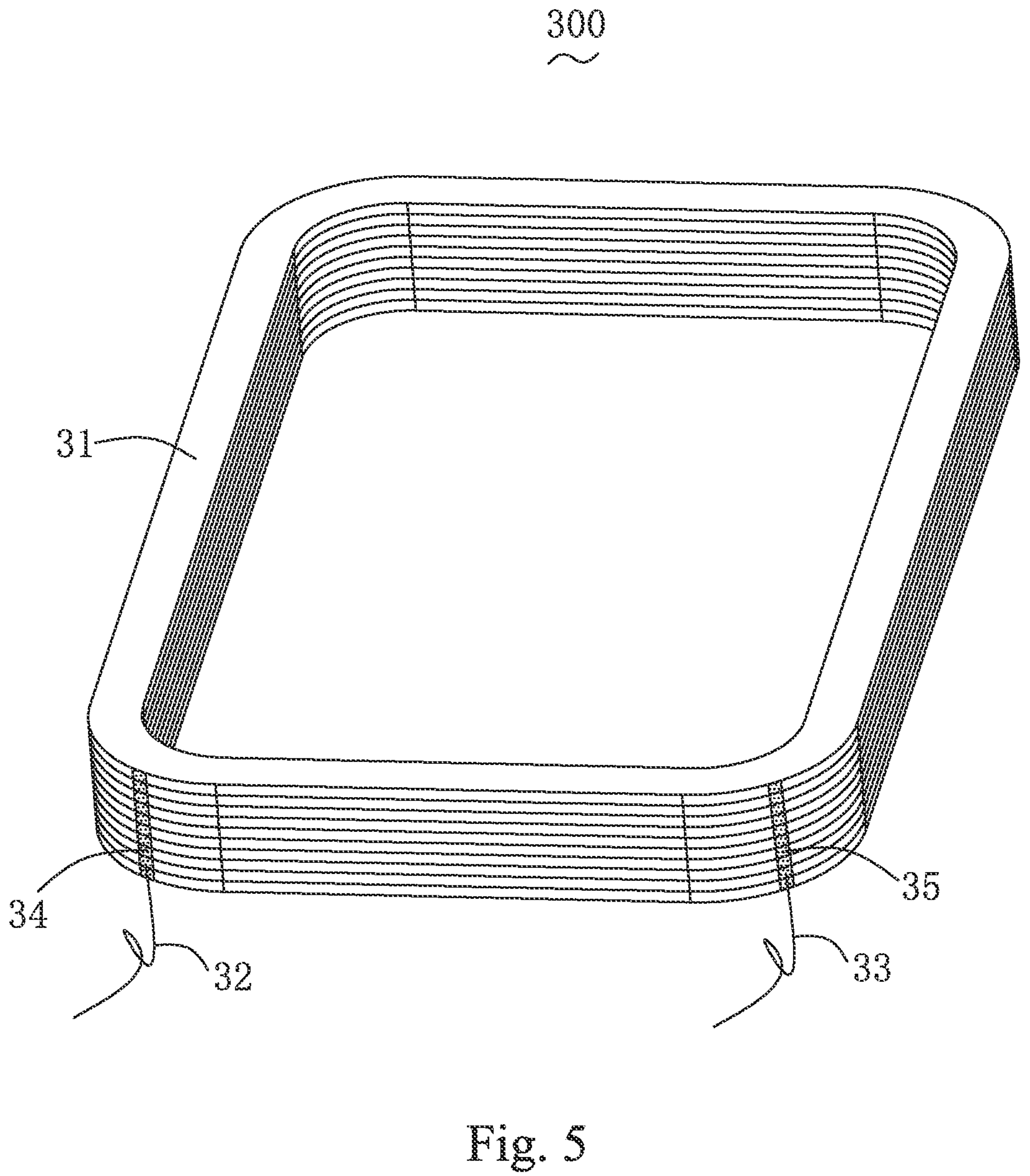
FIG. 5 is a structural schematic diagram of a third voice coil according to the present disclosure.

Referring to FIG. 5, the present disclosure also discloses another voice coil 300 further including an incoming lead 32 and an outgoing lead 33 that are connected to the coil body 31 on the basis of the aforesaid voice coil. The incoming lead 32 is connected to the incoming area 34, and the outgoing lead 33 is connected to the outgoing area 35.

Figure 6:
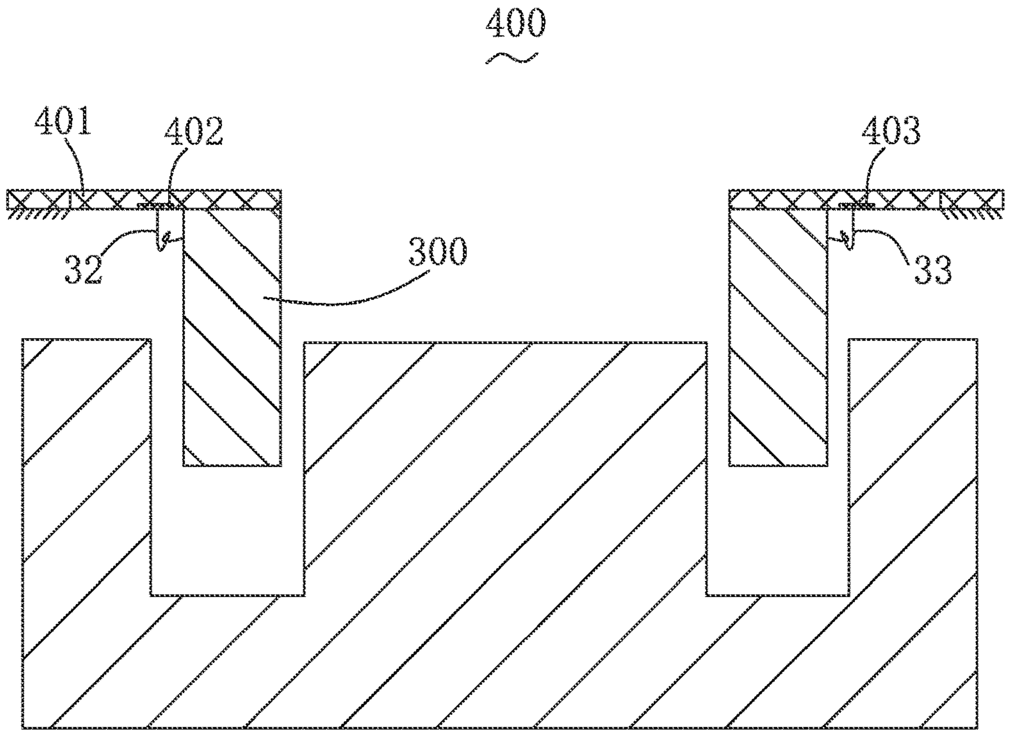
FIG. 6 is a structural schematic diagram of a second sounding device according to the present disclosure.

Referring to FIG. 6, the present disclosure also discloses another sounding device 400 including the voice coil 300. The sounding device 400 further includes a conductive connector 401. The conductive connector 401 is provided with two pads, the incoming lead 32 is connected to one pad 402, and the outgoing lead 33 is connected to the other pad 403. The conductive connector 401 may be a flexible printed circuit board as the aforesaid sounding device 200. The conductive connector 401 is electrically connected to the voice coil 300 and helps to support the voice coil 300. The difference is that the two pads of the conductive connector 401 are connected to the incoming lead 32 and the outgoing lead 33 respectively.

Figure 7:
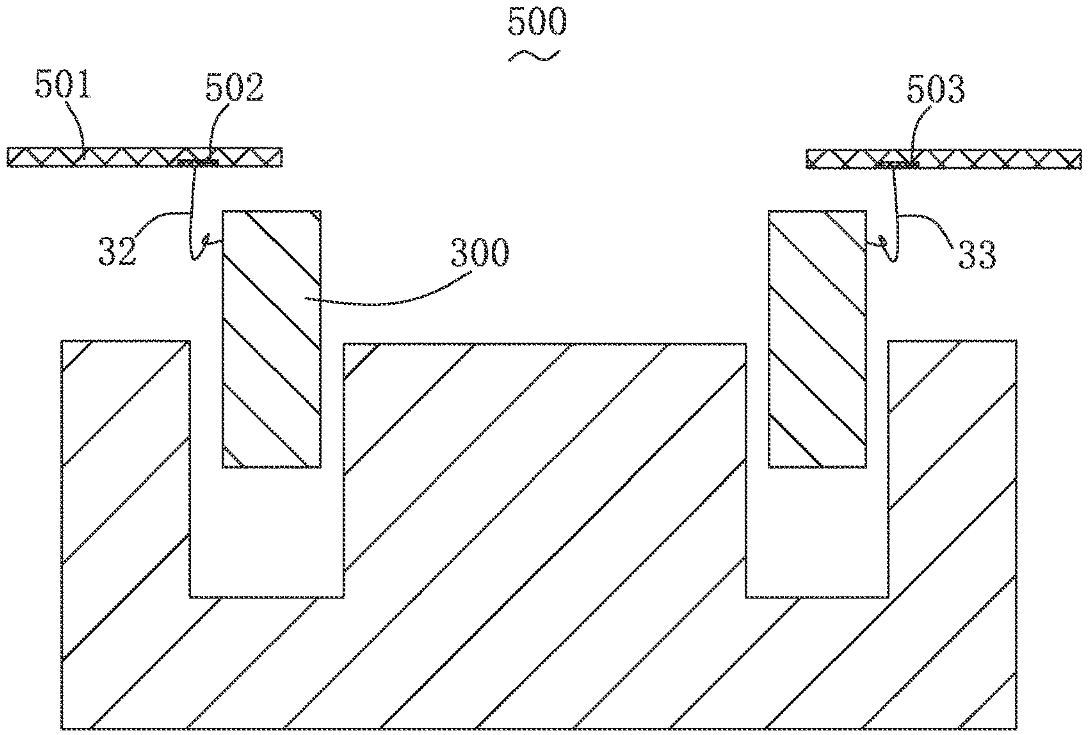
FIG. 7 is a structural schematic diagram of a third sounding device according to the present disclosure.

Referring to FIG. 7, the present disclosure also discloses another sounding device 500 including the voice coil 300. The sounding device 500 further includes a conductive connector 501. The conductive connector 501 is provided with two pads, the incoming lead 32 is connected to one pad 502, and the outgoing lead 33 is connected to the other pad 503. The conductive connector 501 may be a printed circuit board or a conductive terminal fixed to a fixed position of the sounding device 500. The conductive connector 501 is only used to electrically connect the voice coil 300.

In the voice coil and the sounding device using the voice coil according to the present disclosure, the coil body of the voice coil includes at least two sub coils fixed together in sequence. Each sub coil is provided with an incoming wire end and an outgoing wire end. Each sub coil forms only one current path from the incoming wire end to the outgoing wire end and flowing in the same direction. The incoming wire ends of the at least two sub coils are welded together to form an incoming area on the coil body. The outgoing wire ends of the at least two sub coils are welded together to form an outgoing area on the coil body. Compared with the related art, in the case that B, L, and the voltage across the voice coil are certain, the voltage across each sub coil conducted by the incoming area and the outgoing area is same as before, and because the divided wire length of each sub coil becomes smaller, the resistance of each sub coil becomes smaller, if obtain the same driving force as before, the resistance of each sub coil can be larger, as a result, a wire with a lighter weight and a greater resistance can be selected, thereby the weight of the vibration system decreases and the mid-frequency performance of the sounding device gets better.

The above are only embodiments of the present disclosure. It should be pointed out that those of ordinary skill in the art may also make improvements without departing from the ideas of the present disclosure, all of which fall within the protection scope of the present disclosure.

What is claimed is:

1. A voice coil, applied to a sounding device, comprising a coil body, wherein the coil body comprises at least two sub coils fixed together in sequence, each sub coil is provided with an incoming wire end and an outgoing wire end, each sub coil forms only one current path from the incoming wire end to the outgoing wire end and flowing in the same direction, the incoming wire ends of the at least two sub coils are welded together to form an incoming area on the coil body, the outgoing wire ends of the at least two sub coils are welded together to form an outgoing area on the coil body.

2. The voice coil as described in claim 1, wherein the at least two sub coils are stacked up and down in sequence to form the coil body.

3. The voice coil as described in claim 1, wherein the at least two sub coils are sleeved one another in sequence to form the coil body.

4. The voice coil as described in claim 1, wherein each sub coil is wound separately, at least one sub coil has a different wire material than another sub coil.

5. The voice coil as described in claim 1, further comprising an incoming lead connected to the incoming area and an outgoing lead connected to the outgoing area.

6. A sounding device, comprising the voice coil as described in claim 5.

7. The sounding device as described in claim 6, further comprising a conductive connector, wherein the conductive connector is provided with two pads, the incoming lead is connected to one pad, and the outgoing lead is connected to the other pad.

8. A sounding device, comprising the voice coil as described in claim 1.

9. The sounding device as described in claim 8, further comprising a flexible printed circuit board, wherein the flexible printed circuit board comprises a fixed end and a free end extending from the fixed end and connected to the voice coil, the free end is provided with two pads, one pad is connected to the incoming area, and the other pad is connected to the outgoing area.

* * * * *